(12) United States Patent
Takahashi et al.

(10) Patent No.: US 6,462,905 B1
(45) Date of Patent: Oct. 8, 2002

(54) MAGNETIC TAPE CARTRIDGE

(75) Inventors: Daisuke Takahashi; Hideaki Shiga; Seiji Tsuyuki, all of Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 132 days.

(21) Appl. No.: 09/707,774

(22) Filed: Nov. 8, 2000

(30) Foreign Application Priority Data

Nov. 8, 1999 (JP) ............................................ 11-317166
Nov. 9, 1999 (JP) ............................................ 11-318464

(51) Int. Cl.$^7$ ............................................ G11B 23/027
(52) U.S. Cl. ............................................ 360/132
(58) Field of Search ....................... 360/132; 242/338.1, 242/338.2

(56) References Cited

U.S. PATENT DOCUMENTS

| | | | |
|---|---|---|---|
| 5,366,173 A | 11/1994 | Lammers et al. | 242/338.1 |
| 5,901,916 A | 5/1999 | McAllister et al. | 242/348 |
| 6,113,020 A * | 9/2000 | Nayak | 242/338.1 |
| 6,234,416 B1 * | 5/2001 | Nayak | 242/338.1 |
| 6,318,657 B1 * | 11/2001 | Nayak | 242/338.1 |
| 6,344,944 B2 * | 2/2002 | Stabile et al. | 242/336 |

FOREIGN PATENT DOCUMENTS

| | | |
|---|---|---|
| EP | 0 284 687 A2 | 10/1988 |
| EP | 0 926 676 A1 | 6/1999 |
| EP | 1 054 403 A1 | 11/2000 |
| EP | 1 058 259 A2 | 12/2000 |
| WO | 97/15925 | 5/1997 |
| WO | 99/65032 | 12/1999 |

* cited by examiner

Primary Examiner—Robert S. Tupper
(74) Attorney, Agent, or Firm—Sughrue Mion, PLLC

(57) ABSTRACT

A magnetic tape cartridge includes a magnetic tape wound around a single reel, a cartridge casing in which the reel is housed for rotation and a reel stopper which locks the reel not to rotate when the magnetic tape cartridge is not being used and releases the reel to permit to rotate when the magnetic tape cartridge is to be used. The reel stopper includes a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive. The braking member is provided with a braking gear which is adapted to be engaged, to restrict rotation of the reel, with an engagement gear tooth on an engagement projection formed on the reel while the reel is provided with a guide member which centers the braking member with respect to the reel.

4 Claims, 4 Drawing Sheets

PRIOR ART

MAGNETIC TAPE CARTRIDGE

BACKGROUND OF THE INVENTION

1. Field of the Invention

This invention relates to a magnetic tape cartridge comprising a cartridge casing and a single reel which is housed in the cartridge casing for rotation and around which a magnetic tape is wound, and more particularly to a structure of a reel stopper means for preventing rotation of the reel when the magnetic tape cartridge is not being used.

2. Description of the Related Art

As a recording medium for use in an external memory of a computer or the like, there has been known a magnetic tape cartridge comprising a magnetic tape wound around a single reel and a cartridge casing in which the reel is housed for rotation. Since the magnetic tape is used for storing data in a computer or the like and important information is stored on the magnetic tape, the magnetic tape cartridge is provided with a reel stopper means which prevents rotation of the reel when the magnetic tape cartridge is not being used, e.g., when the magnetic tape cartridge is being stored, so that trouble such as tape jam does not occur and the magnetic tape is not accidentally drawn out.

The reel stopper means is provided with a brake member which is adapted to be engaged with the reel to prevent rotation of the reel and is disengaged from the reel to permit rotation of the reel in response to a reel chucking action of the reel drive means of a tape drive such as an external memory when the magnetic tape cartridge is loaded in the tape drive.

In order to improve reliability of the action of the reel stopper means and to prevent dust from entering the cartridge casing, the reel stopper means may be, for instance, of a structure comprising a brake member which restricts rotation of the reel, an urging member which urges the brake member toward a locking position in which the brake member restricts rotation of the reel, and a release member which is moved in response to a reel chucking action of the reel drive means of a tape drive to move the brake member toward a release position in which the brake member releases the reel to permit rotation of the same.

That is, when the magnetic tape cartridge is not being used, the brake member locks the reel so that the reel is not accidentally rotated and the magnetic tape is not accidentally drawn out, and when the magnetic tape cartridge is loaded in a tape drive, the release member drives the brake member to release the reel in response to a reel chucking action of the reel drive means of the tape drive. In this state, the reel can be rotated and loading/unloading of the magnetic tape is permitted.

In such a structure, it is advantageous in simplifying the structure that the release member is adapted to be brought into abutment against a part of the reel drive means of the tape drive and the reel drive means pushes a part of the release member to drive the brake member to release the reel when the reel drive means chucks the reel. However, in this case, when the release member drives the brake member to release the reel, the brake member can be inclined as shown in FIG. 5 and the gear teeth on the brake member can be brought into contact with the rear teeth on the reel while the reel is rotated, which results in generation of noise, obstruction of rotation of the reel and unstable magnetic tape loading/unloading action.

As a cause of the brake member being inclined, that the brake member becomes off-centered and comes to be inclined when the brake member is moved to the locking position where the braking gear thereon is brought into engagement with an engagement gear on the reel and the brake member is moved to the release position in this state can be conceived. Further, that the brake member was incorporated in the magnetic tape cartridge inclined relative to the reel when the magnetic tape cartridge was assembled can be conceived.

When the braking gear teeth on the brake member are like sawteeth in shape and the surface of each tooth facing against the tape-unwinding direction of the reel is substantially normal, though rotation of the reel in the tape-unwinding direction can be surely prevented, there is fear that the magnetic tape is cut when the reel is rotated in the tape-winding direction due to drop impact when the magnetic tape cartridge drops.

That is, when the braking gear and the engagement gear are engaged with each other at a substantially normal surface facing against the tape-unwinding direction, the reel cannot be rotated in the tape-unwinding direction. Further, a leader member such as a leader pin is fixed to the end of the magnetic tape wound around the reel, and the leader member is held near the tape draw-out opening of the cartridge casing when the magnetic tape cartridge is not being used. When the brake member is moved and the braking gear is disengaged from the engagement gear due to drop impact with the reel rotated in the tape-winding direction under inertia, a tape winding force acts on the magnetic tape whose end is fixed by the leader member. Since the reel cannot be rotated in the tape-unwinding direction or the direction in which the tension on the magnetic is released, the tape winding force acting on the magnetic tape can stretch the tape to deteriorate the magnetic recording and reproducing characteristics, remove the leader member from the magnetic tape, cut the magnetic tape, or displace the leader member from the predetermined position to disable the regular tape draw-out action, thereby deteriorating the reliability of the magnetic tape cartridge.

SUMMARY OF THE INVENTION

In view of the foregoing observations and description, the primary object of the present invention is to provide a magnetic tape cartridge in which the braking gear of the reel stopper means is suppressed from being brought into contact with the reel when the reel stopper means is in the release position.

Another object of the present invention is to provide a magnetic tape cartridge in which the reel can be surely prevented from being rotated while occurrence of the magnetic tape being cut can be prevented when the magnetic tape cartridge is not being used.

In accordance with a first aspect of the present invention, there is provided a magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, and the braking member is provided with a braking gear which is adapted to be engaged, to restrict rotation of the reel, with an engagement gear tooth on an engagement projection formed on the reel while the reel is provided with a guide member which centers the braking member with respect to the reel.

It is preferred that the guide member comprises guide ribs which are formed on the inner surface of the reel hub at at least three places, each having an inclined surface which inclines downward from the upper portion of the inner surface of the reel hub toward the center of the reel.

In the magnetic tape cartridge in accordance with the first aspect of the present invention, when the braking member is moved downward from the releasing position to the locking position, the braking member is centered by the guide members so that the braking gear is brought into mesh with the engagement gear teeth with the braking member held horizontal, whereby the braking member is prevented from being inclined in the locking position. When the braking member is subsequently moved to the releasing position by the releasing member, the braking member is held horizontal up to the releasing position. Accordingly, the phenomenon that the braking member is inclined can be suppressed, whereby the braking gear is prevented from contacting the engagement gear teeth to generate noise or to obstruct rotation of the reel.

Further, during assembly of the magnetic tape cartridge, the braking member is automatically centered in the reel hub by the guide members and is incorporated in place in the reel, whereby assembly of the magnetic tape cartridge is facilitated.

In accordance with a second aspect of the present invention, there is provided a magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, and the braking member is provided with a braking gear which is adapted to be engaged, to restrict rotation of the reel, with an engagement gear on an engagement projection formed on the reel, the outer diameter of the engagement gear being larger than that of the braking gear.

In the magnetic tape cartridge in accordance with the second aspect of the present invention, when the braking member is moved downward from the releasing position to the locking position, the braking member is centered by the difference between the outer diameters of the engagement gear and the braking gear so that the braking gear is brought into mesh with the engagement gear teeth with the braking member held horizontal, whereby the braking member is prevented from being inclined in the locking position. When the braking member is subsequently moved to the releasing position by the releasing member, the braking member is held horizontal up to the releasing position. Accordingly, the phenomenon that the braking member is inclined can be suppressed, whereby the braking gear is prevented from contacting the engagement gear teeth to generate noise or to obstruct rotation of the reel.

In accordance with a third aspect of the present invention, there is provided a magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, the braking member is provided with a braking gear which is adapted to be engaged, to restrict rotation of the reel, with an engagement gear tooth on an engagement projection formed on the reel, and each of the gear teeth of the braking gear has a first inclined surface which is brought into abutment against the engagement gear teeth when the reel is rotated in the tape-unwinding direction with the braking gear and the engagement gear tooth in mesh with each other and a second inclined surface which is brought into abutment against the engagement gear teeth when the reel is rotated in the tape-winding direction with the braking gear and the engagement gear tooth in mesh with each other, the first and second inclined surfaces forming therebetween an apical angle not larger than 90°, and the interior angle between the first inclined surface and the vertical being not larger than the interior angle between the second inclined surface and the vertical.

In the magnetic tape cartridge in accordance with the third aspect of the present invention, since the apical angle of the braking gear tooth is not larger than 90° and the interior angle for the first inclined surface of the braking gear tooth which is brought into abutment against the engagement gear teeth when the reel is rotated in the unwinding direction and the interior angle for the second inclined surface which is brought into abutment against the engagement gear teeth when the reel is rotated in the winding direction are not smaller than 30° with the former smaller than the latter, rotation of the reel can be surely prevented and when the reel is rotated in the winding direction due to drop impact or the like and an excessive winding force acts on the magnetic tape, the braking member is moved toward the releasing position along the first inclined surface and the braking gear is disengaged from the engagement gear teeth, whereby the reel is rotated in the unwinding direction to reduce the tension on the magnetic tape, and the magnetic tape can be prevented from being stretched or cut.

DESCRIPTION OF THE PREFERRED EMBODIMENT

Figure 1:
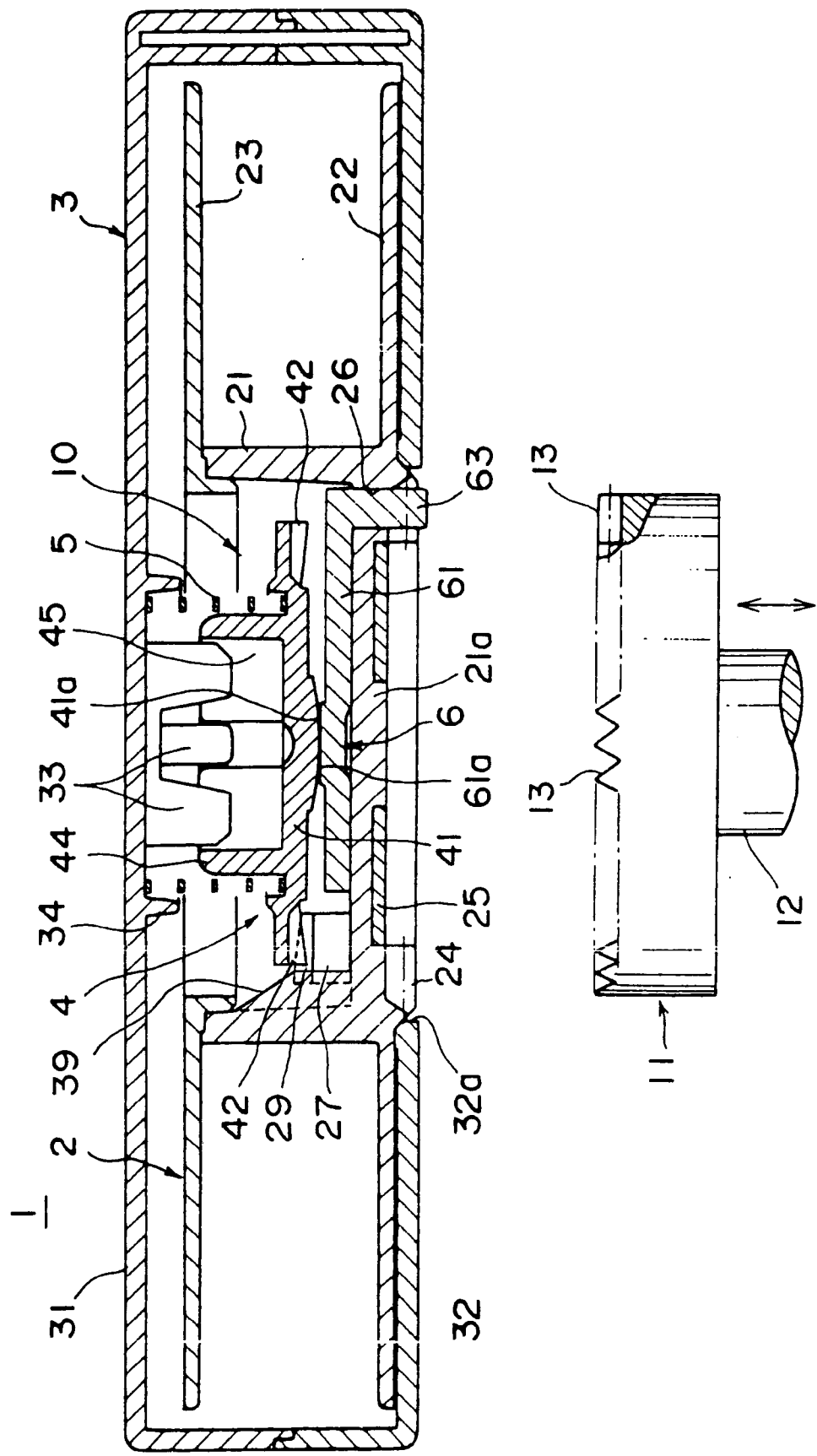
FIG. 1 is a perspective view showing a state of a magnetic tape cartridge in accordance with an embodiment of the present invention when the magnetic tape cartridge is not being used.

A magnetic tape cartridge 1 in accordance with an embodiment of the present invention will be described with reference to the drawings, hereinbelow.

The magnetic tape cartridge 1 comprises a cartridge casing 3 formed by fastening together upper and lower casing halves 31 and 32 by screws or the like. A single reel 2 around which a magnetic tape (not shown) is wound is housed for rotation in the cartridge casing 3. The lower casing half 32 is provided with a central opening 32a. The magnetic tape cartridge 1 is further provided with a reel stopper means 10 which permits rotation of the reel 2 when the magnetic tape cartridge 1 is being used and restricts rotation of the reel 2 when the magnetic tape cartridge 1 is not being used.

The reel 2 comprises a reel hub 21 which is a cylindrical member having a closed bottom and around which the magnetic tape is wound, and lower and upper flanges 22 and 23. The reel hub 21 and the lower flange 22 are integrally formed by synthetic resin molding. The upper flange 23 is bonded to the reel hub 21, for instance, by ultrasonic welding. The reel hub 21 is provided with a bottom wall 21a at the lower end portion thereof and a reel gear 24 for rotating the reel 2 is annularly formed on the lower surface of the bottom wall 21a, and annular reel plate 25 which is magnetically attracted by a reel drive means 11 of a recording and reproducing apparatus is mounted on the lower surface of the bottom wall 21a inside the reel gear 24. The reel 2 is urged downward by an urging means 5 to be described later.

The reel drive means 11 is provided with an annular drive gear 13 and a magnet (not shown) disposed on the top surface of a rotary shaft 12. When the magnetic tape cartridge 1 loaded in a bucket of the tape drive is moved downward toward the rotary shaft 12, the drive gear 13 is brought into mesh with the reel gear 24 and the reel plate 25 is magnetically attracted against the magnet to hold the drive gear 13 and the reel gear 24 in mesh with each other. In this manner, the reel drive means 11 chucks the reel 2.

The mechanism of the reel stopper means 10 will be described, hereinbelow. The reel stopper means 10 comprises a braking member 4 which is movable up and down between a locking position where it is in contact with the reel 2 to restrict rotation of the reel 2 and a releasing position where it is away from the reel 2 to permit rotation of the same, an urging member 5 which urges the braking member 4 toward the locking position, and a releasing member 6 which moves the braking member 4 toward the releasing position.

Figure 3:
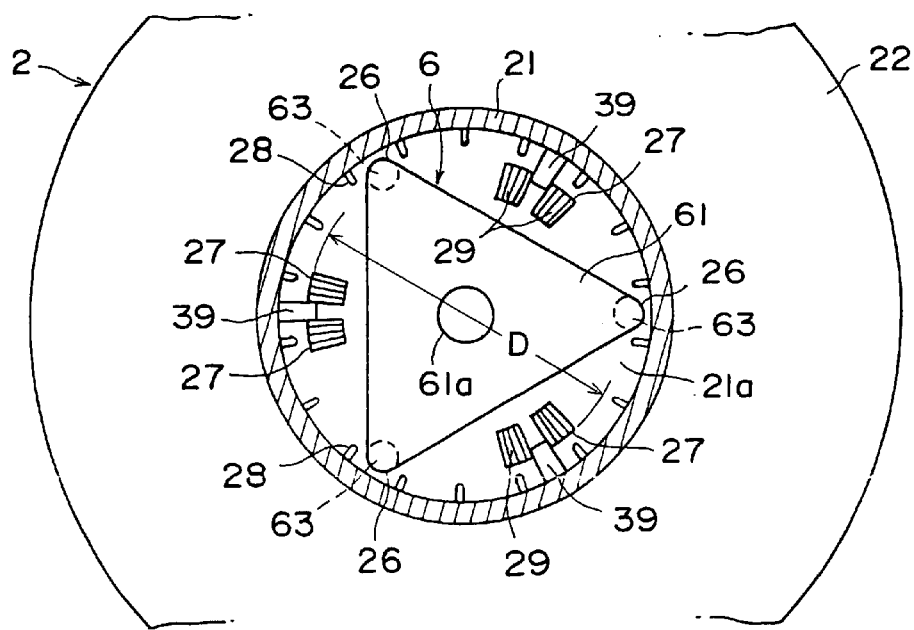
FIG. 3 is a cross-sectional view taken along line A—A in FIG. 2.
Figure 4:
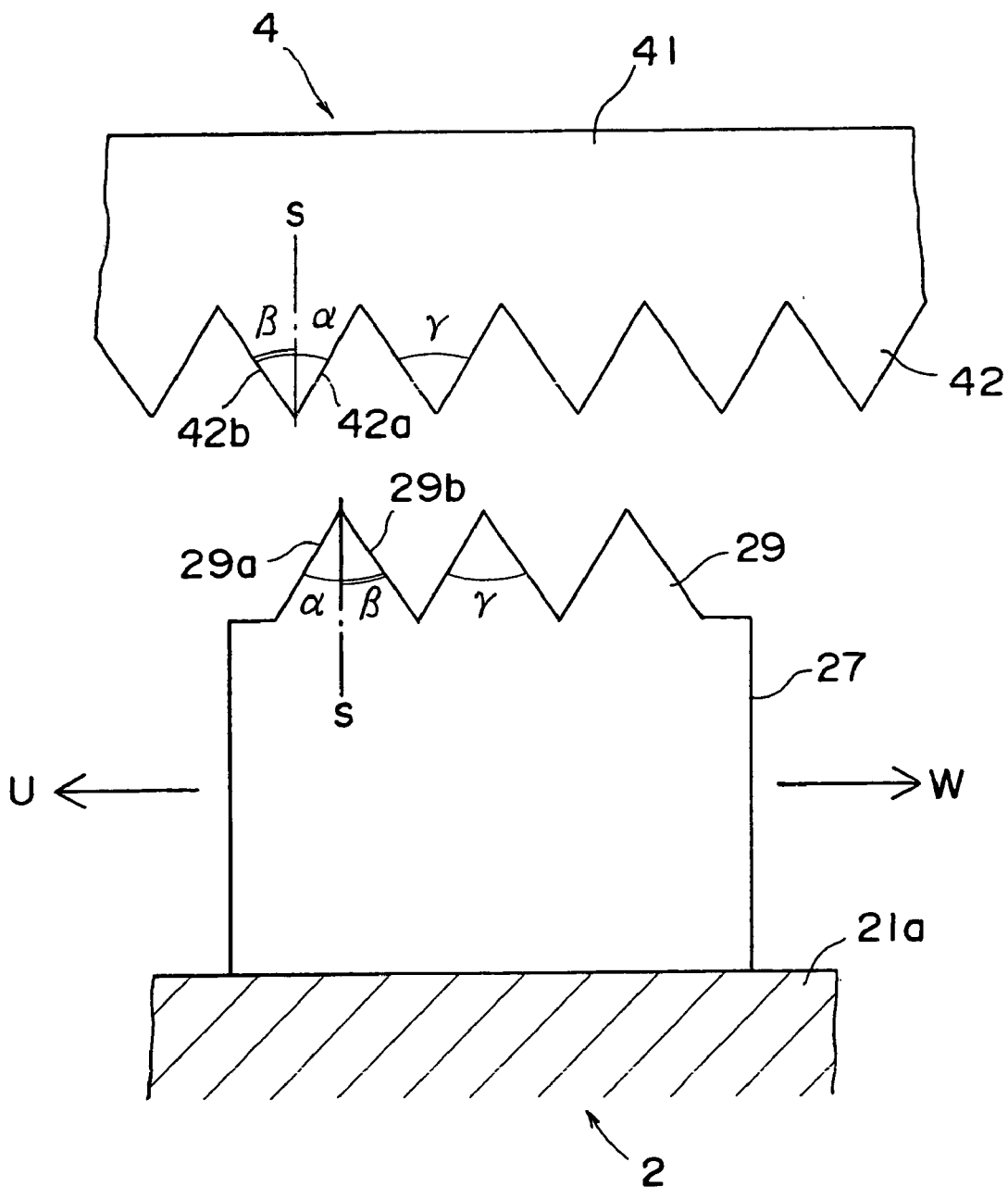
FIG. 4 is a cross-sectional view taken along line B—B in FIG. 2.

As shown in FIG. 3, three through holes 26 are formed in the bottom wall 21a of the reel 2 at regular angular intervals in the circumferential direction to extend through the portion at which the reel gear 24 is formed. On the upper surface of the bottom wall 21a, there are erected three pairs of (six) engagement projections 27 at regular angular intervals in the circumferential direction among the through holes 26. The upper end of each engagement projection 27 is formed into an engagement gear teeth 29 as shown in FIG. 4. The through holes 26 may be larger than three in number and the engagement projections 27 may be larger three pairs in number. Further, the upper end of each engagement projection 27 may be formed into a single gear tooth.

The braking member 4 has a disc portion 41 which is disposed in the reel hub 21 opposed to the bottom wall 21a, and an annular braking gear 42 is formed on the lower surface of the disc portion 41 along the outer peripheral edge thereof. The braking gear 42 is adapted to be engaged with the engagement gear 29 on the engagement projections 27. The central part of the lower surface of the disc portion 41 is convex downward and forms a sliding portion 41a which is pressed against a sliding portion 61a on the upper surface of a body portion 61 of a releasing member 6 to be described later.

The outer diameter D of the engagement gear formed by the engagement gear teeth 29 on the engagement projections 27 on the reel 2 (FIG. 3) is larger than the outer diameter d (FIG. 2) of the braking gear 42 on the braking member 4. The braking gear 42 and the engagement gear 29 are conical in shape and the height of each tooth is higher at the outer periphery thereof. Accordingly, the braking gear 42 is engaged with the engagement gear 42 at their outer peripheries first.

When the braking gear 42 on the braking member 4 is brought into mesh with the engagement gear 29 on the engagement projections 27, the outer periphery of the braking member 4 is guided by guide members 39 formed on the inner surface of the reel hub 21 of the reel 2. The guide members 39 are respectively provided between each pair of engagement projections 27, and accordingly three guide members 39 are provided on the inner surface of the reel hub 21. Each guide member 39 is in the form of a rib having an inclined surface which gradually inclines downward from the upper portion of the inner surface of the reel hub 21 toward the engagement projections 27, and the guide members 39 center the braking gear 42 when the outer periphery of the braking gear 42 is brought into contact with the inclined surfaces.

As shown in FIG. 4, each gear tooth of the braking gear 42 of the braking member 4 and each engagement gear tooth 29 on the engagement projection 27 are triangular in cross-section. The gear tooth of the braking gear 42 has a first inclined surface 42a which faces against the tape-unwinding direction U and abuts against a first inclined surface 29a of the engagement gear tooth 29 on the engagement projection 27 which faces toward the tape-unwinding direction U, and a second inclined surface 42b which faces against the tape-winding direction W and abuts against a second inclined surface 29b of the engagement gear tooth 29 on the engagement projection 27 which faces toward the tape-winding direction W. When the reel 2 is rotated in the tape-unwinding direction U with the braking gear 42 in mesh with the engagement gear teeth 29 on the engagement projection 27, the first inclined surfaces 42a of the gear teeth of the braking gear 42 are brought into abutment against the first inclined surfaces 29a of the engagement gear teeth 29, and when the reel 2 is rotated in the tape-winding direction W with the braking gear 42 in mesh with the engagement gear teeth 29 on the engagement projection 27, the second inclined surfaces 42b of the gear teeth of the braking gear 42 are brought into abutment against the second inclined surfaces 29b of the engagement gear teeth 29. Each of the gear tooth 42 and the gear tooth 29 is not larger than 90° in apical angle γ, and the interior angle α between the first inclined surface 42a (or 29a) and the vertical S and the interior angle β between the second inclined surface 42b (or 29b) and the vertical β are not smaller than 30°. Further, the interior angle α for the first inclined surface 42a (29a) is not larger than the interior angle β for the second inclined surface 42b (29b). That is, $60° \leq \gamma \leq 90°$, $30° \leq \alpha \leq 45°$, and $30° \leq \beta \leq 60°$.

A projection 44 extends upward from the upper surface of the disc portion 41 of the braking member 4, and a cross-shaped engagement groove 45 is formed in the projection 44 to extend in the vertical direction. An engagement projection 33 extending downward from the inner surface of the upper casing half 31 of the cartridge casing 3 is in engagement with the engagement groove 45 of the braking member 4, whereby the braking member 4 is held in the cartridge casing 3 to be movable up and down but not to be rotatable.

A coiled spring (urging member) 5 is compressed between a portion of the upper surface of the disc portion 41 around the projection 44 and a spring retainer portion 34 formed on the upper casing half 31 around the engagement projection 33, whereby the braking member 4 is urged toward the locking position where the braking gear 42 is engaged with the engagement gear teeth 29 on the engagement projections 27.

The releasing member 6 is disposed to be movable up and down between the braking member 4 and the bottom wall 21a of the reel hub 21 and comprises a substantially triangular plate-like body portion 61. A cylindrical leg portion 63 extends downward from the lower surface of the body portion 61 at each corner thereof. The leg portions 63 are passed through the through holes 26 in the bottom wall 21a of the reel 2 to be movable up and down. The engagement projections 27 are positioned between the leg portions 63 outside the body portion 61 of the releasing member 6. The leg portions 63 may also be rectangular or ellipsoidal in cross-section.

Figure 2:
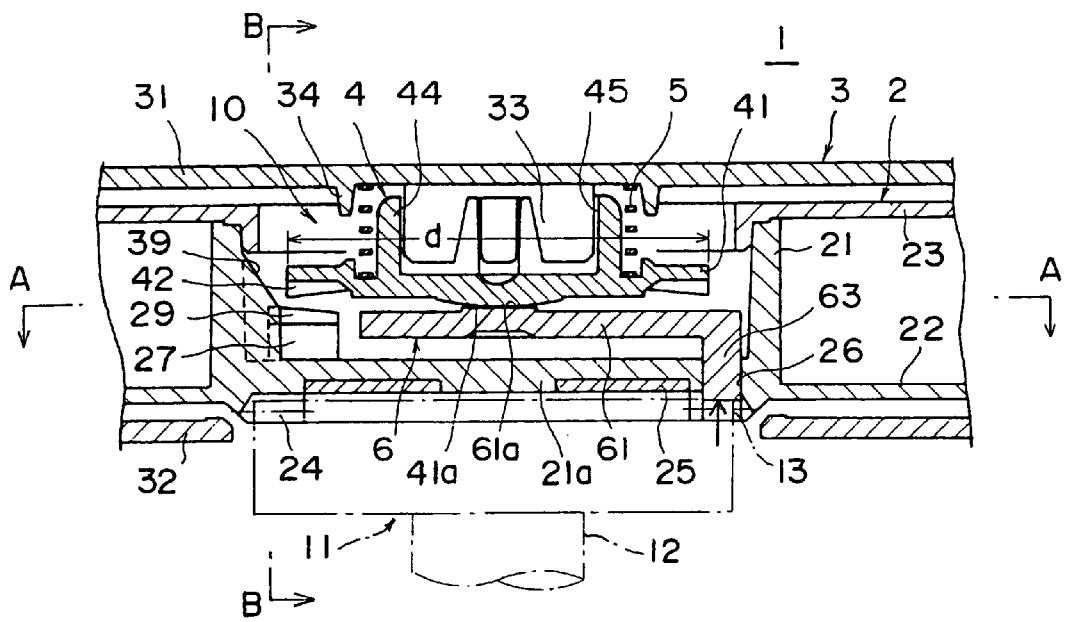
FIG. 2 is a fragmentary cross-sectional view of the magnetic tape cartridge shown in FIG. 1 when the magnetic tape cartridge is being used.

When the releasing member 6 is in its lowermost position shown in FIG. 1, the lower ends of the leg portions 63 project downward form the lower surface of the reel 2 through the portion at which the reel gear 24 is formed, and when the drive gear 13 is brought into engagement with the reel gear 24 in response to a chucking action of the reel drive means 11, the leg portions 63 are pushed upward by a predetermined stroke as shown in FIG. 2, whereby the braking gear 42 of the braking member 4 is disengaged from the engagement gear teeth 29 of the engagement projections 27 and rotation of the reel 2 is permitted. Since the leg portions 63 are passed through the through holes 26 the releasing member 6 is rotated together with the reel 2.

The reel 2 is provided with guide members 28 (FIG. 3) which guide the releasing member 6 when the leg portions 63 are inserted into the through holes 26. Each of the guide members 28 guides a corner of the body portion 61 of the releasing member 6 and comprises a pair of guide ribs formed on the inner surface of the reel hub 21 to extend in the vertical direction near one of the through holes 26. Reinforcing ribs like the guide ribs are provided on the entire inner surface of the reel hub 21.

Operation of the reel stopper means 10 will be described, hereinbelow. FIG. 1 shows a state of the magnetic tape cartridge 1 when it is not being used (e.g., when it is stored). In the state shown in FIG. 1, the braking member 4, releasing member 6 and the reel 2 are held in the lower casing half 32 of the cartridge casing 3 under the force of the urging member 5 and the central opening 32a of the lower casing half 32 is closed by the reel 2. The releasing member 6 is in its lowermost position where its lower surface is in abutment against the upper surface of the bottom wall 21a of the reel hub 21 and the lower end portions of the leg portions 63 project downward beyond the tips of the teeth of the reel gear 24. The braking member 4 is in abutment against the releasing member 6 and in its locking position where the braking gear 42 is in mesh with the engagement gear teeth 29 of the engagement projections 27 on the reel 2, whereby rotation of the reel 2 is restricted and the magnetic tape is prevented from being drawn out.

As shown in FIG. 2, when the magnetic tape cartridge 1 is loaded in a tape drive, the rotary shaft 12 of the reel drive means 11 of the tape drive is moved toward the lower surface of the reel 2 and the drive gear 13 is brought into mesh with the reel gear 24 with the reel 2 slightly pushed upward, whereby the leg portions 63 of the releasing member 6 are pushed upward by the tips of the teeth of the drive gear 13. Thus, the releasing member 6 is moved upward overcoming the force of the urging member 5 and the braking member 4 is moved upward together with the releasing member 6, whereby the braking gear 42 is disengaged from the engagement gear teeth 29 of the engagement projections 27 and rotation of the reel 2 is permitted. In this state, the braking member 4 in its upper position is away from the guide members 39 and does not restrict rotation of the reel 2 when the magnetic tape is loaded/unloaded.

Figure 5:
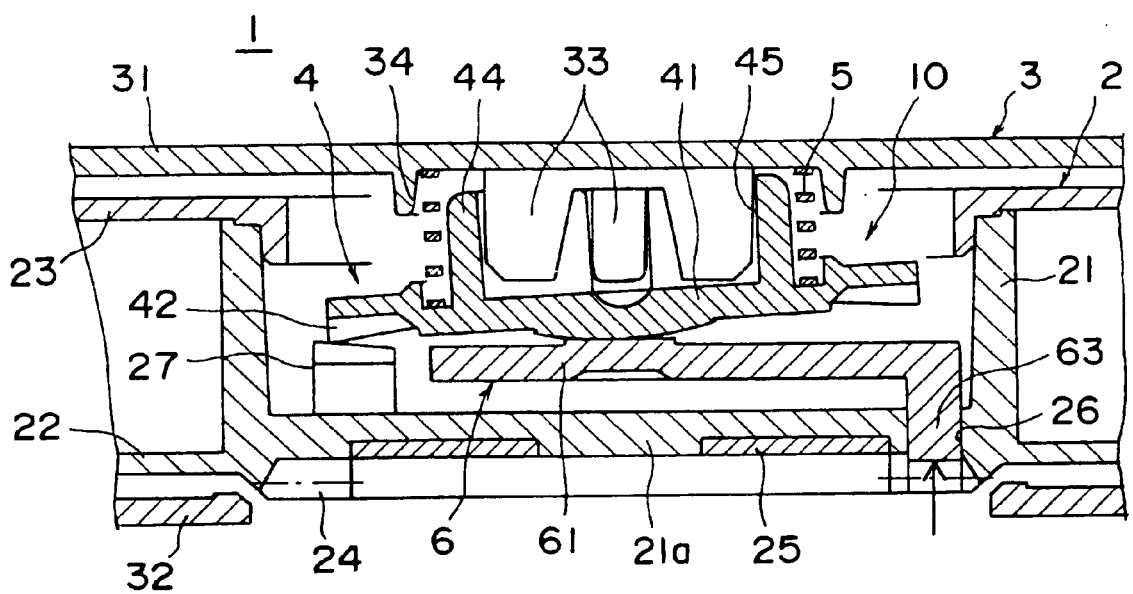
FIG. 5 is a fragmentary cross-sectional view showing a state of a magnetic tape cartridge where the braking member is inclined.

When the braking member 4 is moved downward from the releasing position to the locking position, the braking member 4 is centered by the guide members 39 on the reel 2 so that the braking gear 42 is brought into mesh with the engagement gear teeth 29 with the braking member 4 held horizontal, whereby the braking member 4 is prevented from being inclined in the locking position. When the braking member 4 is subsequently moved upward to the releasing position by the releasing member 6, the braking member 4 is held horizontal up to the releasing position. Accordingly, the phenomenon that the braking member 4 is inclined as shown in FIG. 5 can be suppressed, whereby the braking gear 42 is prevented from contacting the engagement gear teeth 29 to generate noise or to obstruct rotation of the reel 2. Further, during assembly of the magnetic tape cartridge 1, the braking member 4 is automatically centered in the reel hub 2 by the guide members 39 and is incorporated in place in the reel 2, whereby assembly of the magnetic tape cartridge 1 is facilitated.

Even if the guide members 39 are not provided, since the outer diameter D of the engagement gear formed by the engagement gear teeth 29 on the engagement projections 27 on the reel 2 is larger than the outer diameter d of the braking gear 42 on the braking member 4, the braking member 4 is centered with respect to the reel hub 2 when it is moved from the releasing position to the locking position by virtue of the difference in diameter so that the braking gear 42 is brought into mesh with the engagement gear teeth 29 with the braking member 4 held horizontal, whereby the braking member 4 is prevented from being inclined in the locking position.

Further, when the reel 2 is rotated in the winding direction W due to drop impact or the like and an excessive winding force acts on the magnetic tape, the braking member 4 is moved upward along the first inclined surfaces 42a and 29a since the interior angles α for the first inclined surfaces 42a and 29a which are brought into abutment against each other when the reel 2 is rotated in the unwinding direction U are not smaller than 30° and the braking gear 42 is disengaged from the engagement gear teeth 29, whereby the reel 2 is rotated in the unwinding direction U to reduce the tension on the magnetic tape, and the magnetic tape can be prevented from being stretched or cut.

Further, since the interior angles β for the second inclined surfaces 42b and 29b of the braking gear 42 and the engagement gear teeth 29 are not smaller than 30°, the reel 2 can be anyhow rotated even if the braking member 4 is in the locking position, though the rotation of the reel 2 is restricted. Accordingly, when the magnetic tape is accidentally drawn out from the cartridge casing 3 during storage or the like of the magnetic tape cartridge 1, the magnetic tape can be rewound into the cartridge casing 3.

The effect of reducing the tension on the magnetic tape can be obtained when the interior angle α is not smaller than 30°. However when the interior angle α is larger than 45°, the locking force for preventing rotation of the reel 2 in the unwinding direction becomes too weak. That is, in order to ensure both the effect of reducing the tension on the magnetic tape and the sufficient locking force, it is necessary that the apical angle γ is not larger than 90° and the interior angles α for the first inclined surfaces 42a and 29a which are brought into abutment against each other when the reel 2 is rotated in the unwinding direction U are smaller than the interior angles β for the second inclined surfaces 42b and 29b which are brought into abutment against each other when the reel 2 is rotated in the winding direction W.

The height of the gear teeth of the braking gear 42 and that of the engagement gear teeth 29 are set according to the distance between the locking position and the releasing position of the braking member 4. For a given height of the teeth, the number of the teeth is reduced and the one-pitch length is increased as the apical angle γ increases. Accordingly, when the apical angle γ is set not to be larger than 90°, the number of the gear teeth of the braking gear 42 is increased and the one-pitch length is reduced, whereby slack of the magnetic tape or the tension on the magnetic tape can be proper when the braking gear 42 is engaged with the engagement gear teeth 29.

In addition, all of the contents of Japanese patent application Nos. 11(1999)-317166, 11(1999)-318464 and 2000-322841 are incorporated into this specification by reference.

What is claimed is:

1. A magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, and the braking member is provided with a braking gear which is adapted to be engaged, to restrict rotation of the reel, with an engagement gear tooth on an engagement projection formed on the reel while the reel is provided with a guide member which centers the braking member with respect to the reel.

2. A magnetic tape cartridge as defined in claim 1 in which the guide member comprises guide ribs which are formed on the inner surface of the reel hub at at least three places, each having an inclined surface which inclines downward from the upper portion of the inner surface of the reel hub toward the center of the reel.

3. A magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, and the braking member is provided with a braking gear which is adapted to be engaged, to restrict rotation of the reel, with an engagement gear on an engagement projection formed on the reel, the outer diameter of the engagement gear being larger than that of the braking gear.

4. A magnetic tape cartridge comprising a magnetic tape wound around a single reel, a cartridge casing in which the reel is housed for rotation and a reel stopper means which locks the reel not to rotate when the magnetic tape cartridge is not being used and releases the reel to permit rotation thereof when the magnetic tape cartridge is to be used, wherein the improvement comprises that the reel stopper means comprises a braking member which is movable between a locking position where it is in contact with the reel to restrict rotation of the reel and a releasing position where it is away from the reel to permit rotation of the same, an urging member which urges the braking member toward the locking position, and a releasing member which is rotated integrally with the reel and moves the braking member toward the releasing position in response to a reel chucking action of the reel drive means of a tape drive, the braking member is provided with a braking gear which is adapted to be engaged, to restrict rotation of the reel, with an engagement gear tooth on an engagement projection formed on the reel, and each of the gear teeth of the braking gear has a first inclined surface which is brought into abutment against the engagement gear teeth when the reel is rotated in the tape-unwinding direction with the braking gear and the engagement gear tooth in mesh with each other and a second inclined surface which is brought into abutment against the engagement gear teeth when the reel is rotated in the tape-winding direction with the braking gear and the engagement gear tooth in mesh with each other, the first and second inclined surfaces forming therebetween an apical angle not larger than 90°, and the interior angle between the first inclined surface and the vertical being not larger than the interior angle between the second inclined surface and the vertical.

* * * * *